US006054665A

United States Patent [19]

Focke et al.

[11] Patent Number: 6,054,665
[45] Date of Patent: Apr. 25, 2000

[54] APPARATUS FOR CHECKING (CIGARETTE) PACKS

[75] Inventors: Heinz Focke, Verden; Carmen Kramski, Verden-Eitze; Vladimir Hanuska, Verden, all of Germany

[73] Assignee: Focke & Co. (GmbH Co.), Verden, Germany

[21] Appl. No.: 09/008,072

[22] Filed: Jan. 16, 1998

[30] Foreign Application Priority Data

Jan. 17, 1999 [DE] Germany .......................... 197 01 618

[51] Int. Cl.[7] .............................. B07C 5/00; B65G 65/12

[52] U.S. Cl. .......................... 209/576; 209/535; 209/536; 209/587; 198/626.1

[58] Field of Search .................................... 209/576, 577, 209/586, 587, 517, 518, 522, 523, 524, 535, 536; 198/626.1, 626.4, 606, 608

[56] References Cited

U.S. PATENT DOCUMENTS

| | | | |
|---|---|---|---|
| 3,805,489 | 4/1974 | Lieder et al. | 198/166 |
| 4,053,056 | 10/1977 | Day . | |
| 4,330,064 | 5/1982 | Weinert . | |
| 4,585,126 | 4/1986 | Paddock et al. | 209/587 |
| 5,213,218 | 5/1993 | DiGrande et al. | 209/586 |
| 5,240,117 | 8/1993 | Focke et al. | 198/626.1 |
| 5,752,607 | 5/1998 | Fink | 209/576 |
| 5,794,788 | 8/1998 | Massen | 209/587 |
| 5,813,542 | 9/1998 | Cohn | 209/587 |

FOREIGN PATENT DOCUMENTS

| | | |
|---|---|---|
| 37972 | 10/1981 | European Pat. Off. . |
| 330495 | 8/1989 | European Pat. Off. . |
| 3021806 | 11/1981 | Germany . |
| 3801388 | 7/1988 | Germany . |
| 3532068 | 8/1989 | Germany . |
| 4112263 | 10/1992 | Germany . |
| 4212676 | 10/1992 | Germany . |
| 4209028 | 9/1993 | Germany . |
| 9313115 | 11/1994 | Germany . |
| 195 38 013 | 4/1996 | Germany . |
| 91/09688 | 7/1991 | WIPO . |

*Primary Examiner*—Donald P. Walsh
*Assistant Examiner*—Brett C. Martin
*Attorney, Agent, or Firm*—Sughrue, Mion, Zinn, Macpeak & Seas, PLLC

[57] ABSTRACT

Following a process or handling apparatus, in particular following a drying turret (11), (cigarette) packs (10) are transported along a horizontal conveying section. The latter has a checking section (30). In the region of this checking section, the cameras (48, 49) check the packs (10) for correct formation. In the region of the checking section (30), the packs (10) are transported, or retained by intermediate belts (31, 32), such that the cameras (48, 49) can sense a sub-region of the packs (10) in optimum fashion in each case.

13 Claims, 11 Drawing Sheets

APPARATUS FOR CHECKING (CIGARETTE) PACKS

Figure 1:
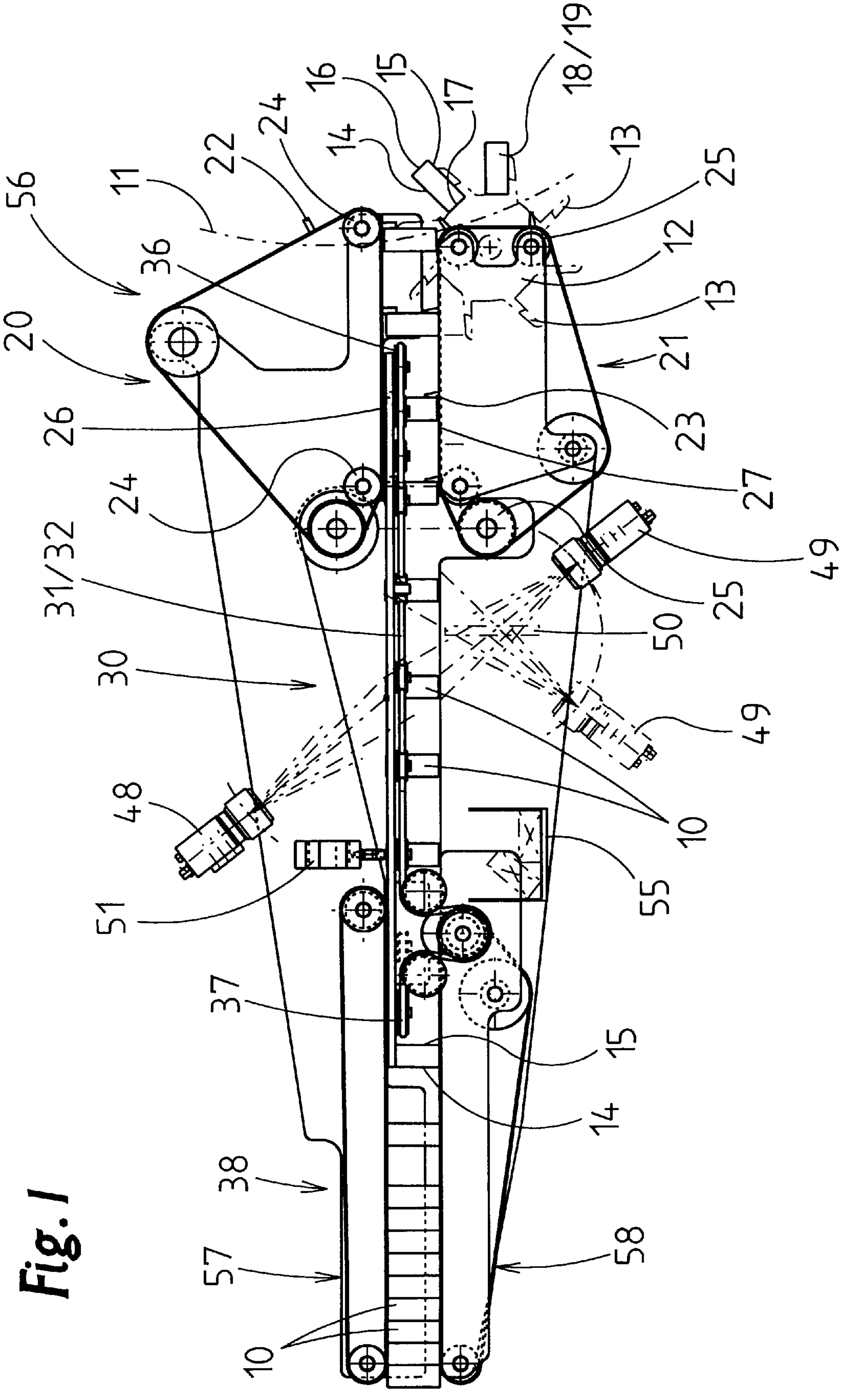

The invention relates to an apparatus for the optoelectronic checking of, in particular, cuboidal (cigarette) packs once the latter has left a packaging machine, it being possible, in the region of a checking section, for the packs to be transported by a conveyor and, during the transportation, checked for correct formation by optoelectronic monitoring elements, in particular by cameras, and for defective packs to be separated out.

In the production of cigarette packs, the correct formation of the packs has to be monitored particularly carefully. Defective packs have to be separated out. The checking of the outer appearance of the packs involves, on the one hand, checking for the correct configuration, that is to say for correct folding and gluing of folding tabs, but also for the presence of revenue stamps and the correct printing.

It is known to use cameras to monitor cigarette packs during construction. This involves the cameras or other monitoring elements being positioned such that optimum checking of the outer appearance of the packs is possible with the lowest possible outlay. Furthermore, it is important to integrate the checking operation into the production process of the packs such that the conveying stream or movement sequence for production is not interrupted.

Accordingly, the object of the invention is to configure the monitoring and/or checking of packs, in particular cigarette packs, such that monitoring elements, in particular cameras, for precise, non-defective checking are positioned at the optimum location.

In order to achieve this object, the apparatus according to the invention is characterized in that, in the region of the (horizontal) checking section, the packs can be transported exclusively by conveying belts, which, by way of a conveying strand, butt against mutually opposite pack surfaces which are directed to the side, namely against a base surface, on the one hand, and against an end surface, on the other hand. The conveying belts for the packs are designed with a small cross-section, in particular as round belts, such that only small regions of the pack surfaces are covered by the conveying belts, in each case one camera being positioned, according to the invention, above and beneath the movement path of the packs such that the longitudinal axes of the cameras, or of the optical system, are directed at an angle with respect to the plane of the movement path of the packs and diametrically opposite surface regions of the packs can be sensed optically by the two cameras.

The apparatus according to the invention is characterized by a straightforward construction and by precise frictionally locking conveying of the packs between mutually opposite conveying belts. The packs are transported in a defined relative position, namely with the small surfaces (end surfaces and base surfaces) directed to the side and with narrow side surfaces directed upwards and downwards. In this position, the packs coming from a packaging machine or a drying unit are fed and transported on once they have been checked. There is no change in the relative position.

A further special feature of the invention is that the packs are checked with more or less total exclusion of extraneous light. For this purpose, the cameras at least in part, namely the passive rays thereof to the object which is to be checked, and/or a region of the checking section with the packs and the conveying elements is/are arranged in wholly or partially closed chambers or housings. A checking housing in this case is designed such that the conveying elements with the packs can enter into the closed checking housing on one side and can leave said housing again on the opposite side.

Figure 2:
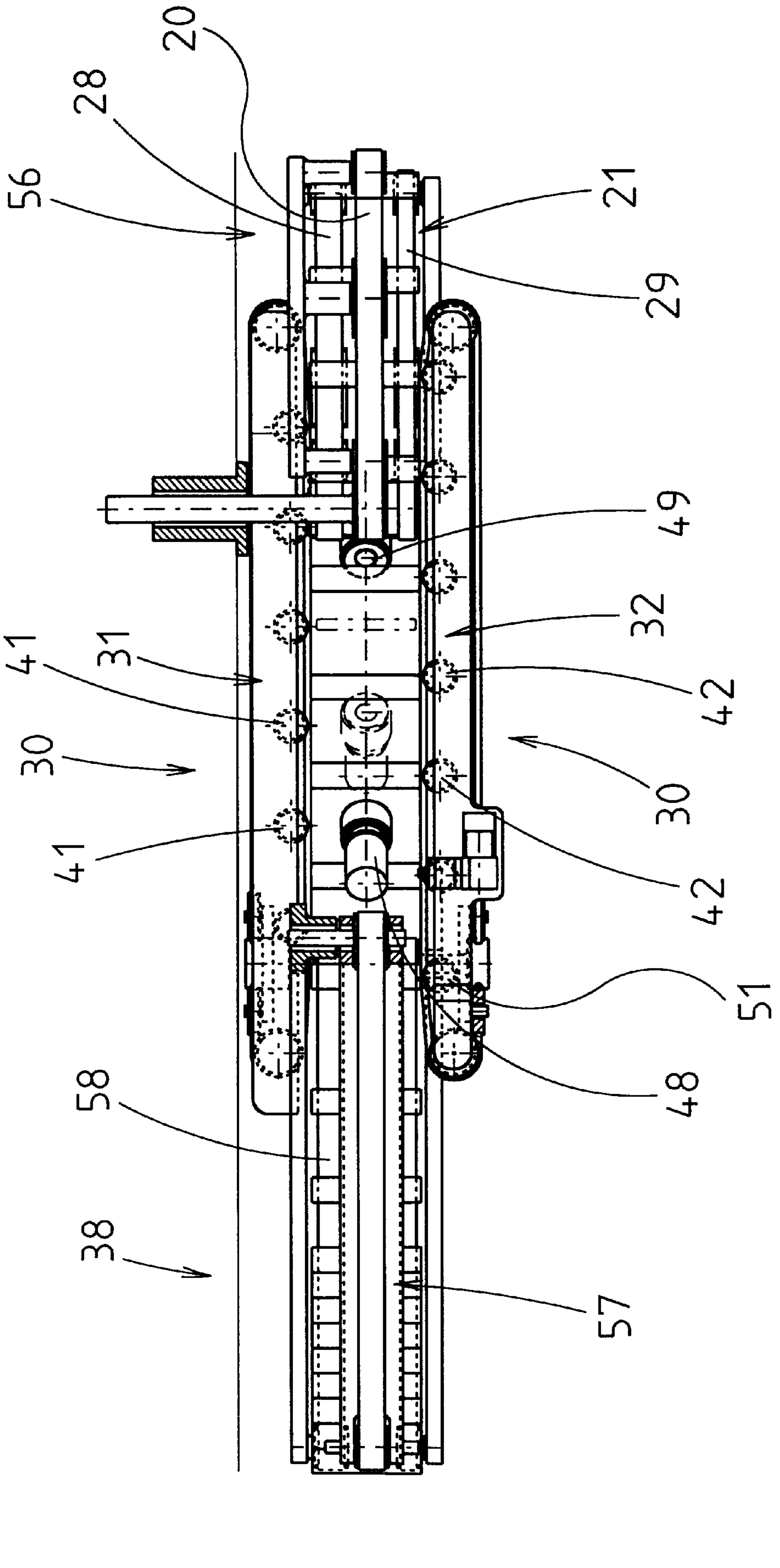
Figure 3:
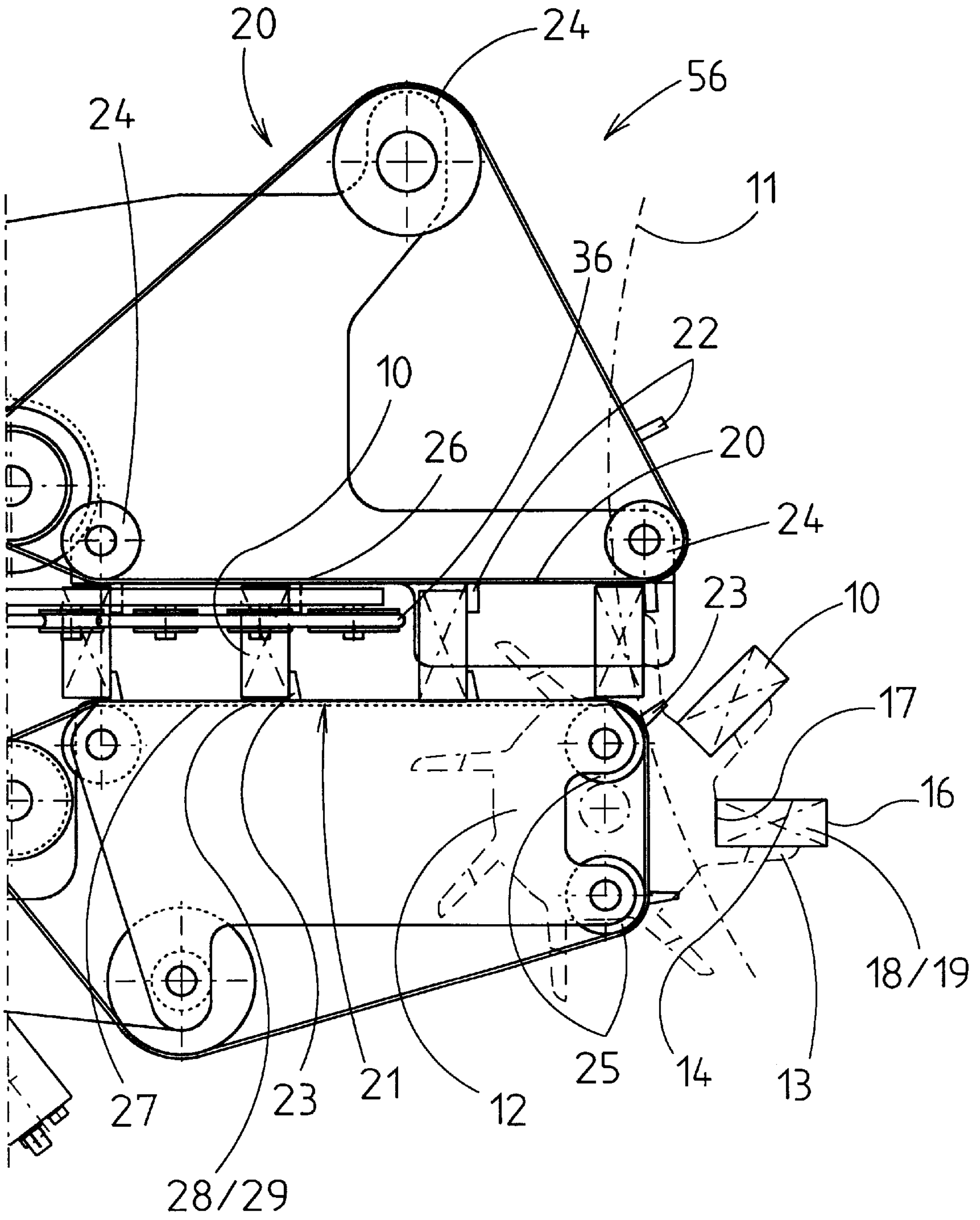
Figure 4:
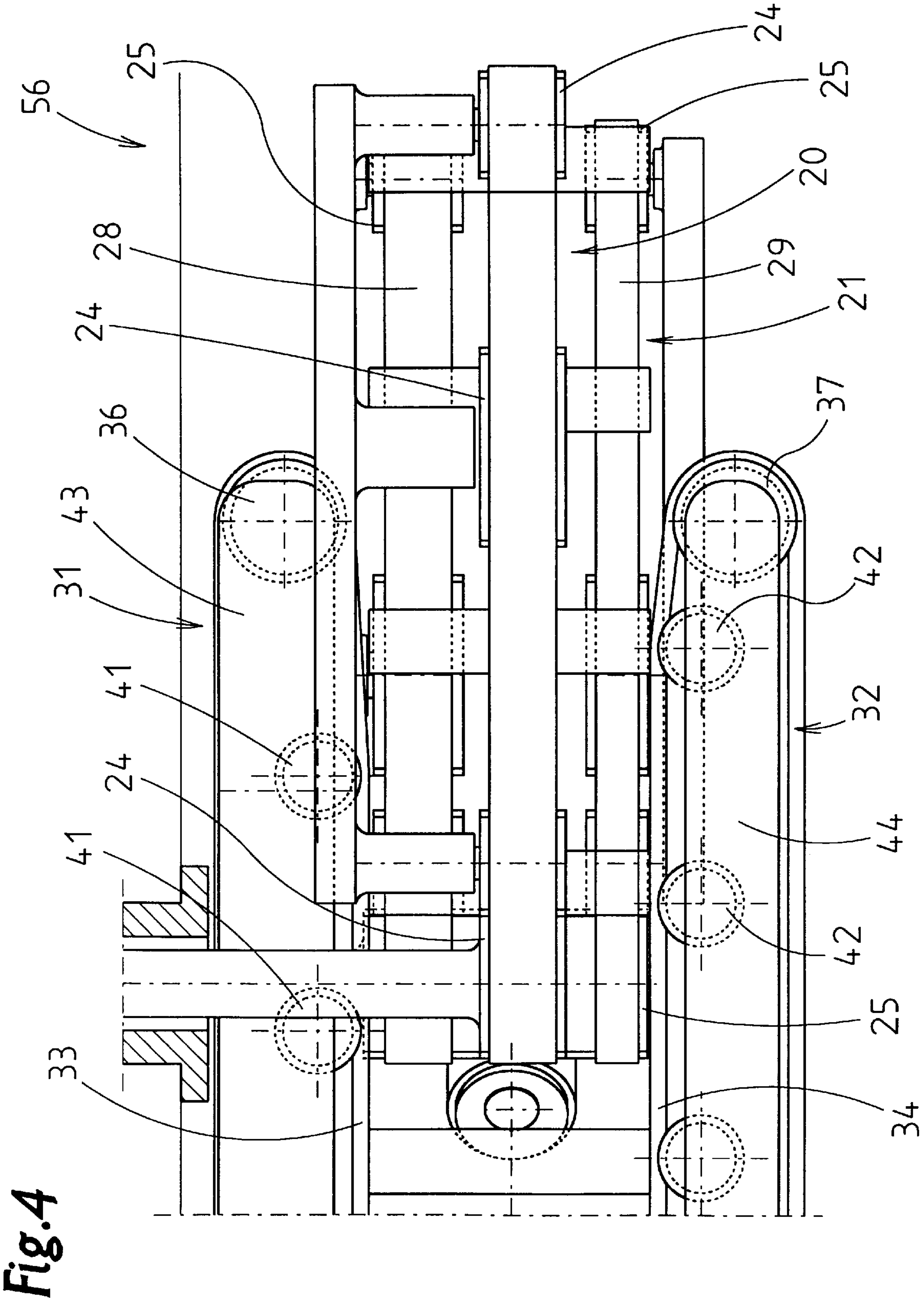
Figure 5:
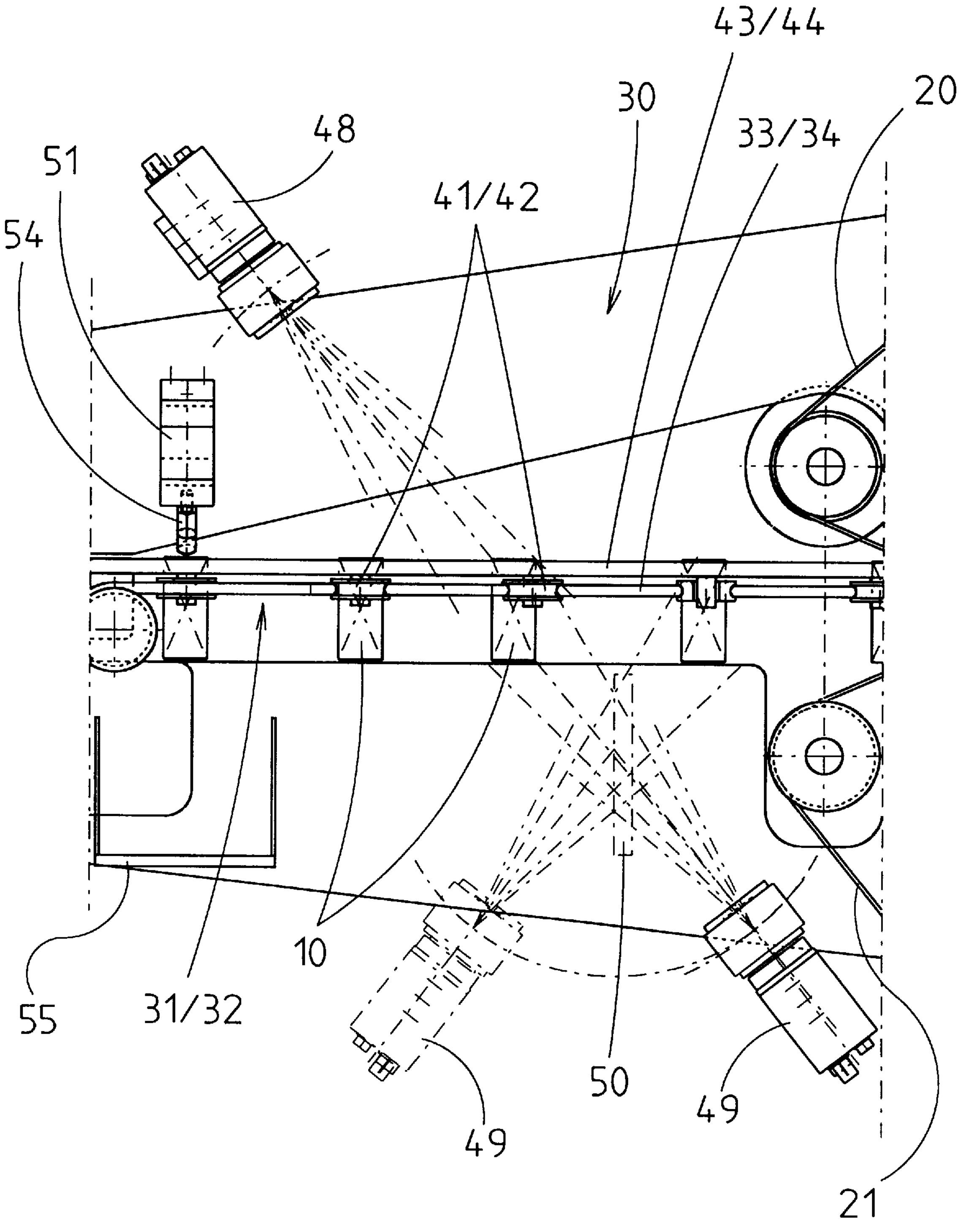
Figure 6:
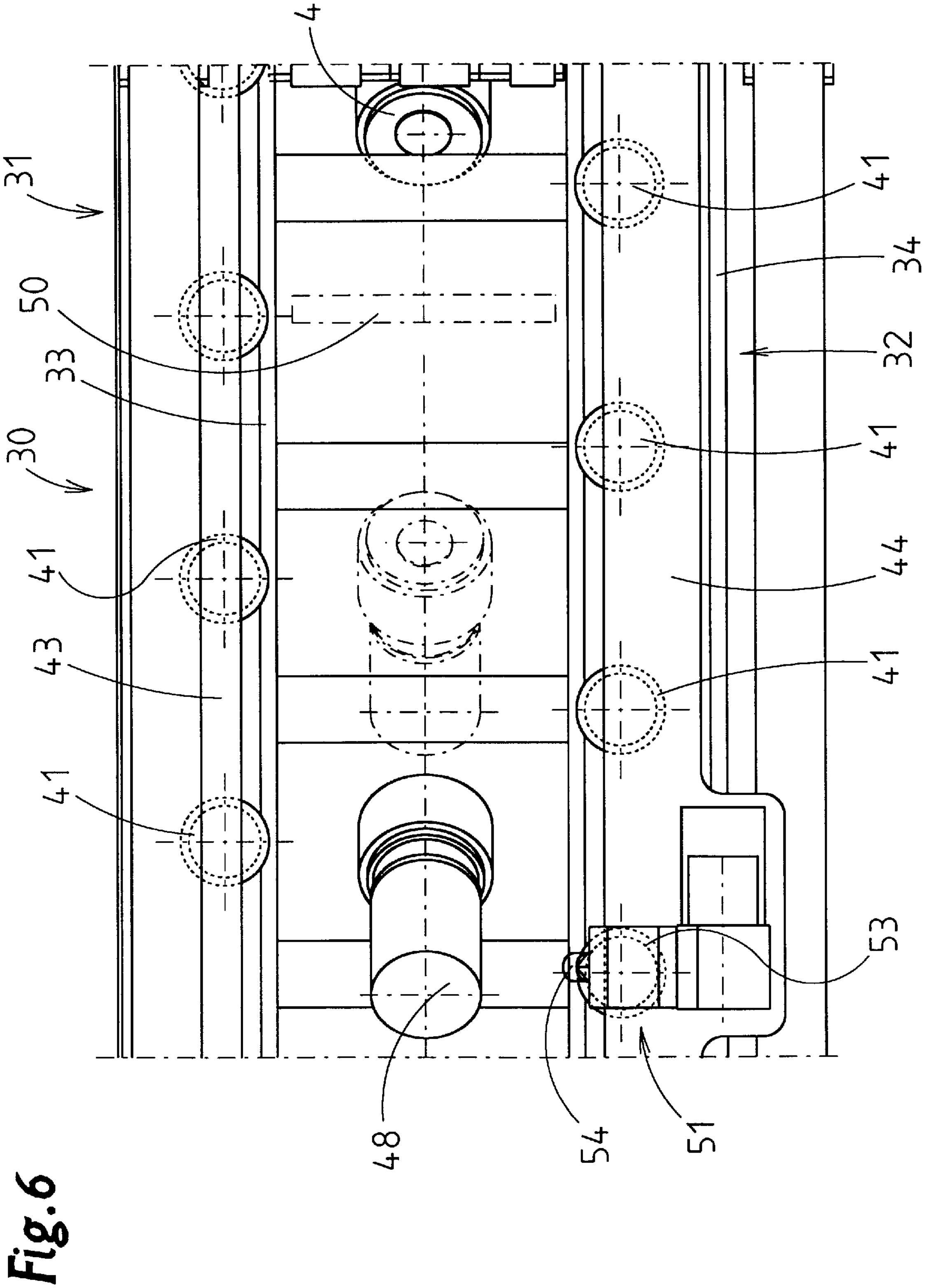
Figure 7:
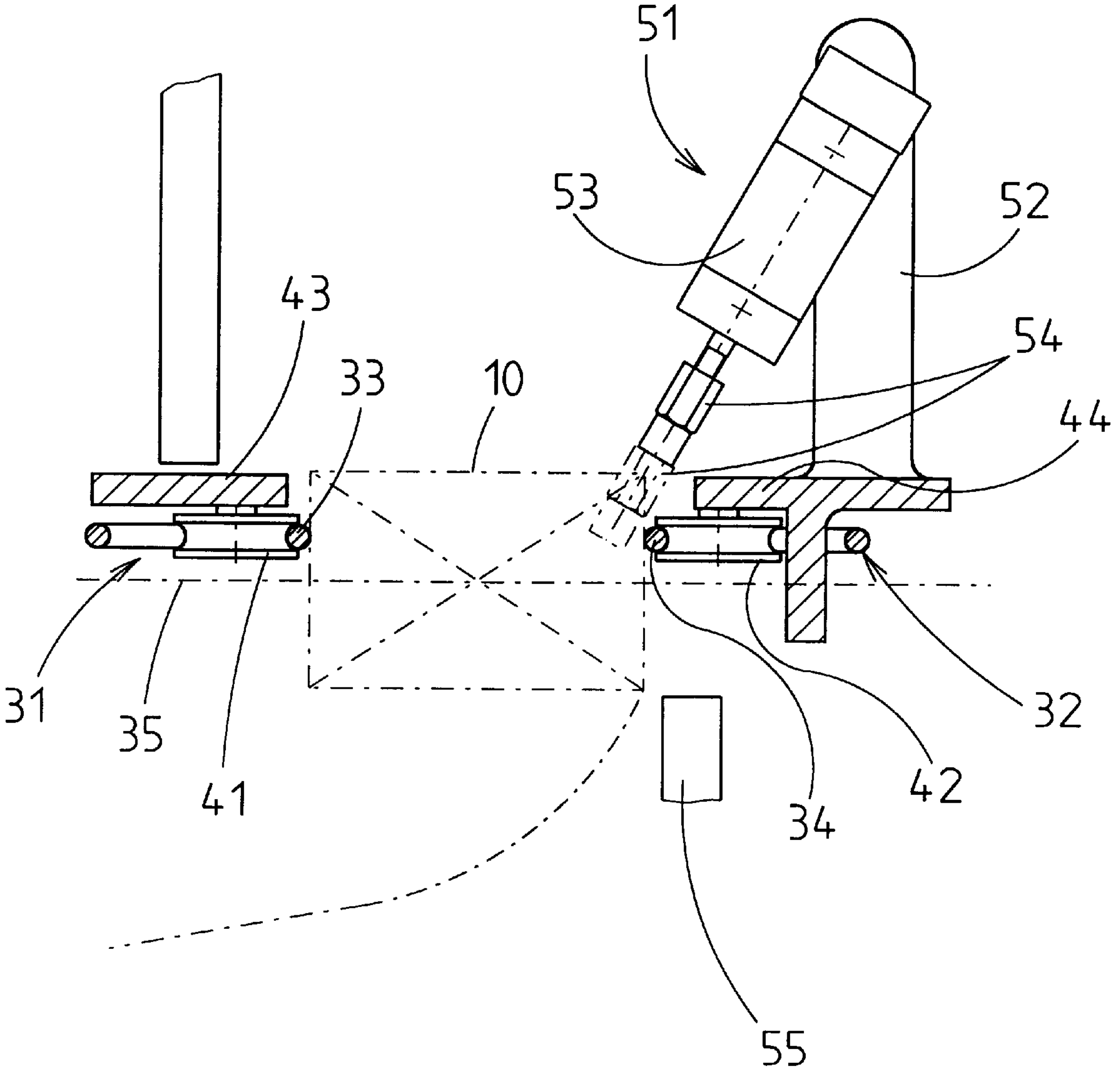
Figure 8:
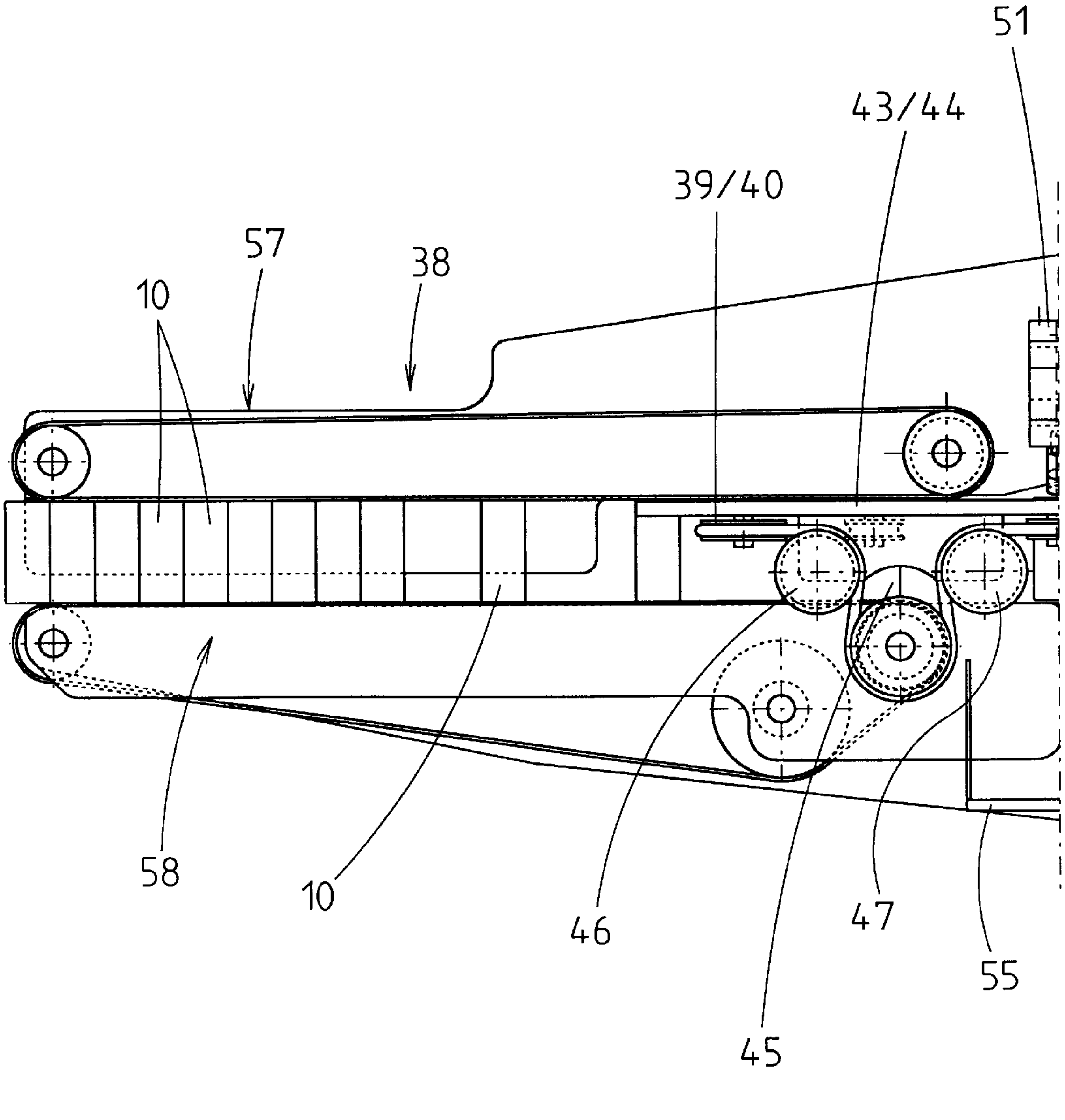
Figure 9:
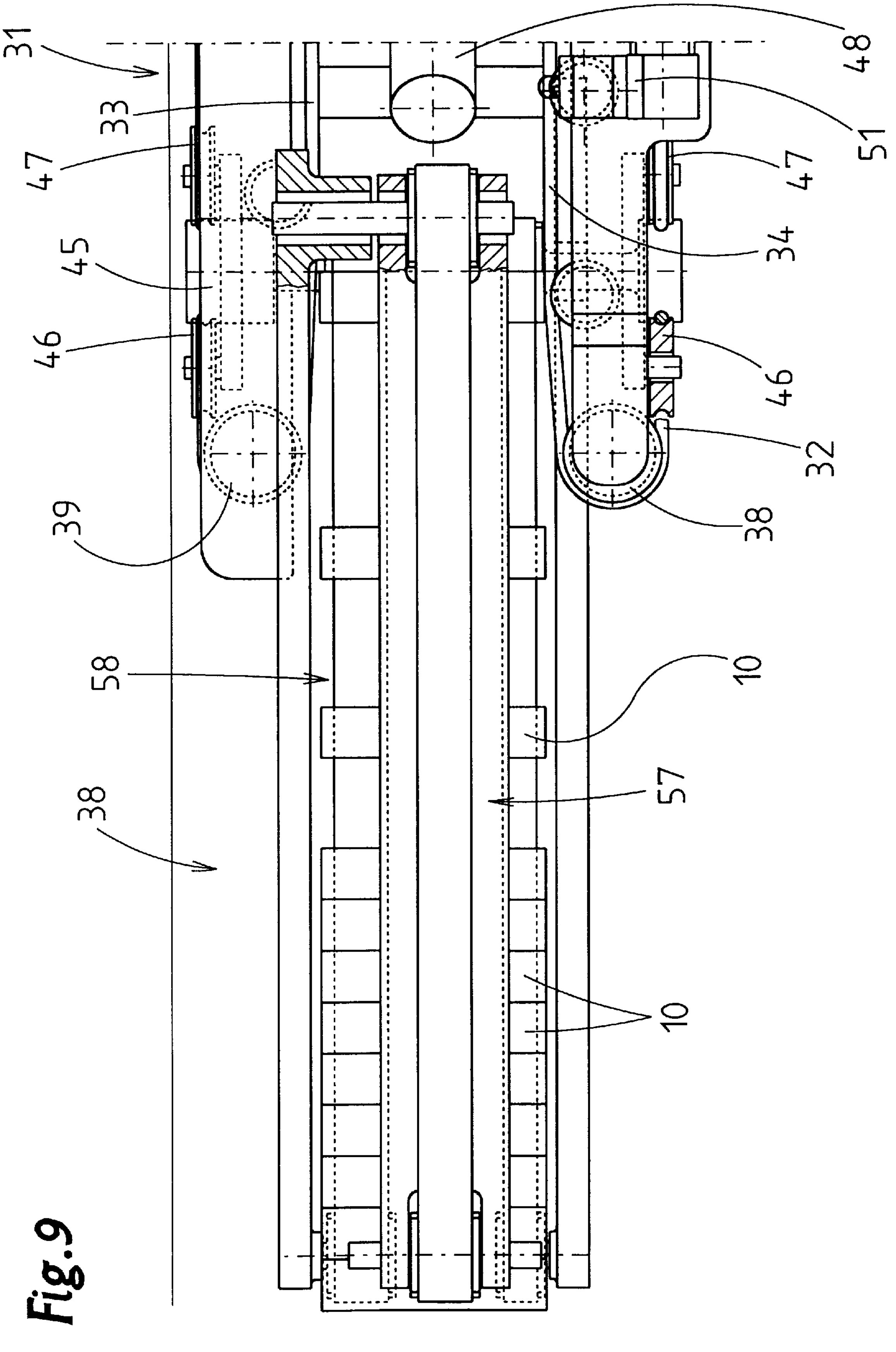
Figure 10:
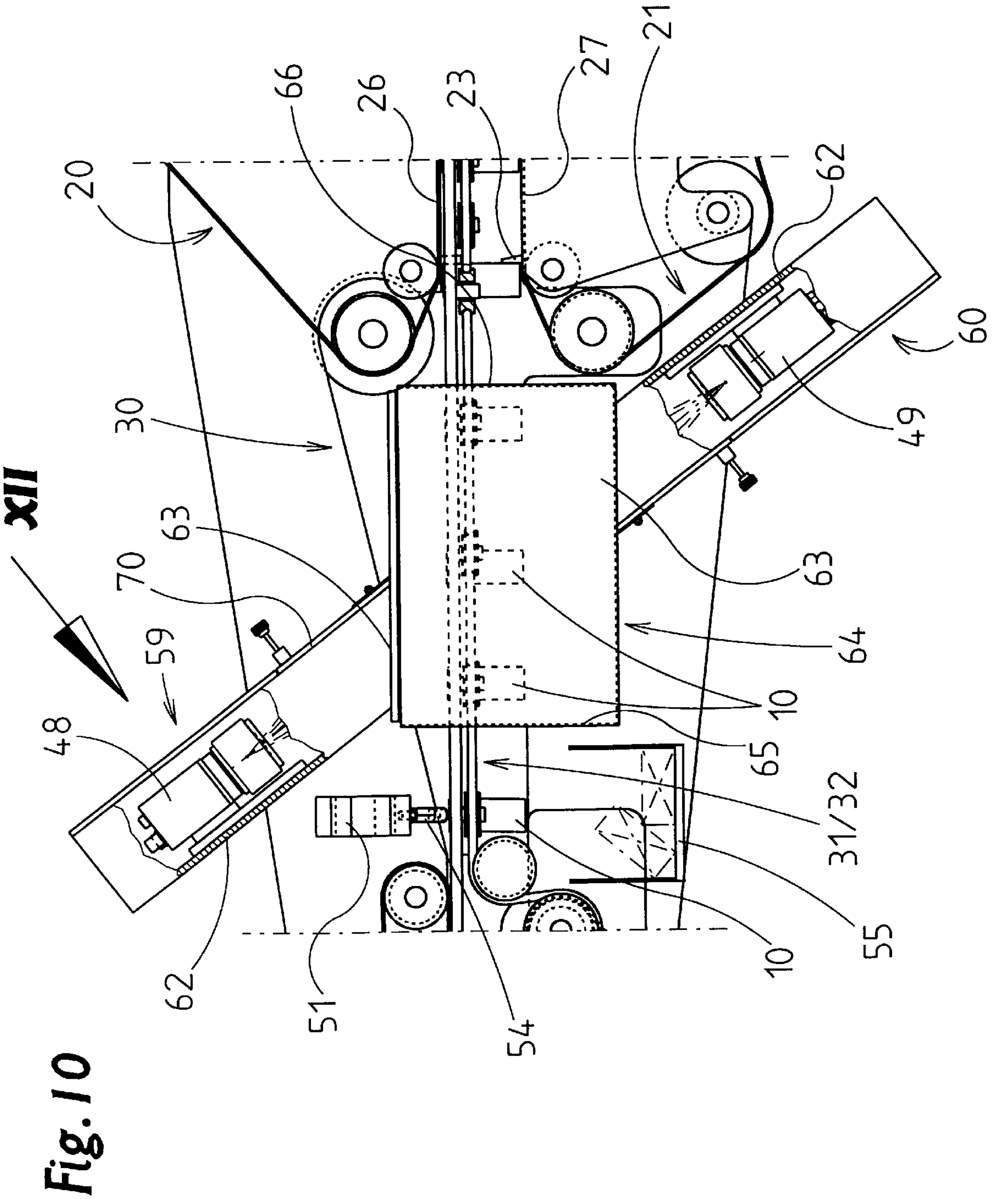
Figure 11:
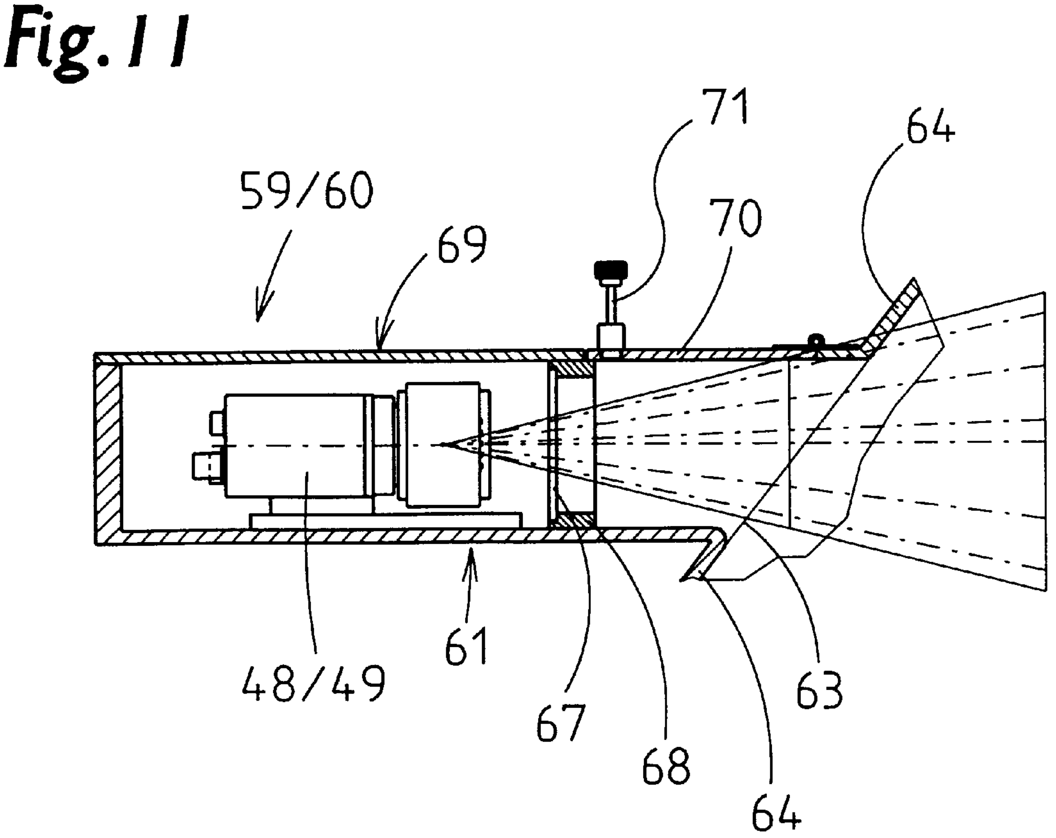
Figure 12:
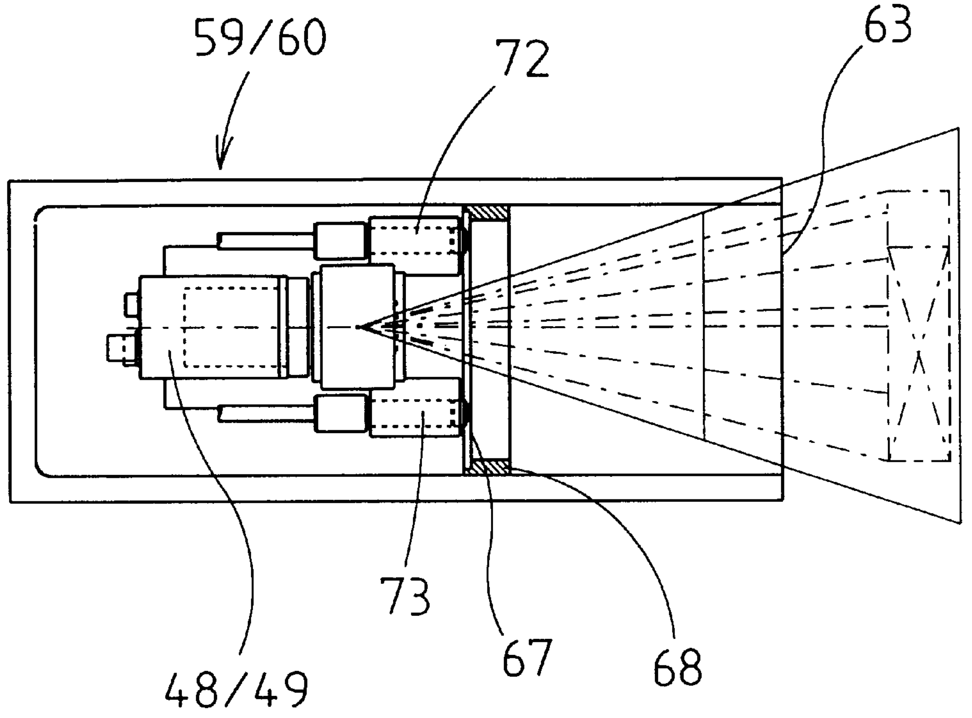

Further details of the invention relate to the design of the conveying elements, to the positioning of the cameras and of an ejector and to the configuration of housings for a checking operation which is free of extraneous light. An exemplary embodiment of the apparatus is explained in more detail hereinbelow with reference to the drawings, in which:

FIG. 1 shows a schematic side view of the conveying apparatus with checking elements for packs, FIG. 2 shows a plan view of the apparatus according to FIG. 1, FIG. 3 shows, on an enlarged scale, a side view of an initial region of the apparatus, FIG. 4 shows a plan view of the detail according to FIG. 3, FIG. 5 shows, likewise on an enlarged scale, a side view of a region of the checking section as a central region of the conveying apparatus, FIG. 6 shows a plan view of FIG. 5, FIG. 7 shows a cross-section of the apparatus in the region of the checking section, FIG. 8 shows a side view of an outlet region of the conveying apparatus, FIG. 9 shows a plan view of the detail of FIG. 8, FIG. 10 shows a side view, partly in section, of a region of a checking location for packs in another embodiment of the apparatus, FIG. 11 shows, on a further-enlarged scale, a longitudinal section of a detail of FIG. 10, and FIG. 12 shows a view of the detail in the direction is of arrow XII in FIG. 10.

The exemplary embodiment which is illustrated in FIGS. 1 to 9 has the task of handling cuboidal packs 10, namely cigarette packs. These may be packs 10 of the hinge-lid-box type or of the soft-carton type. FIG. 1 shows essential parts of a conveying unit for transporting the packs 10 over a horizontal conveying section. The packs 10 come, for example, from a (first) drying turret 11. The latter may be designed in the manner which is described and shown in U.S. Pat. No. 4,942,715.

Once they have left the drying turret 11, the packs 10 are received by a transfer conveyor, in the present case by a continuously circulating star wheel 12. The latter is provided with a plurality of projecting fingers 13 which each grip one pack 10 and introduce it into the conveying unit.

In the region of the conveying unit, the packs 10 are transported in a defined relative position. A large-surface-area front side 14 is directed forwards in the transporting direction, and a correspondingly designed rear side 15 is directed rearwards in the transporting direction. Elongate, narrow side surfaces 16 and 17 are located at the top and bottom, while the base surface 18 and end surface 19 are oriented to the side.

The packs 10 are introduced, by the star wheel 12, into a preliminary conveyor 56, which comprises a top belt 20 and a bottom belt 21. The top belt 20 and bottom belt 21 have carry-along elements 22, 23 which respectively grip the packs 10 at the top and bottom, on its rear side 15, and define a precise distance between successive packs 10. The top belt 20 and bottom belt 21 are guided over deflection rollers 24 and 25, respectively. These are arranged so as to form horizontal conveying strands which are directed towards the packs 10, namely a top strand 26 and bottom strand 27. The top strand 26 butts against the upwardly oriented pack surface, namely against the side surface 16, and the bottom strand 27 butts against a bottom pack surface, namely against the bottom side surface 17.

In order to ensure transfer of the packs 10 to the conveying unit or the preliminary conveyor 56, the bottom conveyor, that is to say the bottom belt 21, is divided, in other words it comprises two individual, spaced-apart belts 28, 29. The star wheel 12 is positioned such that it runs between the individual belts 28, 29 and, as a result, can introduce the packs 10 in a precise position between the top strand 26 and bottom strand 27.

The inlet conveying region, formed by the preliminary conveyor 56, is of limited length. It is adjoined by a checking section 30. In the region of the latter, the outer configuration of the packs 10 is checked during continuous transportation of said packs. Defective packs 10 are identified and separated out.

In the region of the checking section 30, the packs 10 are received and transported by a separate conveyor—while maintaining the distances between them. This conveyor is constituted by intermediate belts 31, 32 which run in a horizontal plane on both sides of the packs 10. These intermediate belts are designed such that they are of low overall height, and thus grip the packs 10 only on narrow, strip-like regions. In the case of the present exemplary embodiment, use is made of a round belt, that is to say a belt of round cross-section (see, in particular, FIG. 7). It is in a top region of the packs 10, in any case above an imaginary horizontal centre plane 35, that conveying strands 33 and 34, directed towards the packs 10, of the said intermediate belts 31, 32 butt against the packs 10, to be precise against the surfaces directed to the side—the base surface 18 and end surface 19. The packs 10 are not supported or retained in any other way by conveying elements, but rather are transported exclusively in such a way that they "hang" between the conveying strands 33, 34.

On the inlet side, the intermediate belts 31, 32 extend into the region of the preliminary conveyor 56. End rollers 36, 37 for deflecting the intermediate belts 31, 32 are mounted laterally alongside the top belt 20 and bottom belt 21. On the opposite side, the intermediate belts 31, 32 extend into the region of an end conveyor or removal conveyor 38 for the packs 10. End rollers 39, 40 for the intermediate belts 31, 32 are mounted in the region of the removal conveyor 38, to be precise likewise laterally alongside the latter.

The conveying strands 33, 34 of the intermediate belts 31, 32 are provided with guides or supports which ensure the transmission of precise pressure-exerting forces to the packs 10 during transportation. This involves a number of pressure-exerting rollers 41, 42 which are arranged at regular intervals from one another on both sides of the packs 10. The accompanying, pressure-exerting rollers 41, which rotate in horizontal planes, on one side are offset with respect to the pressure-exerting rollers 42 on the other side of the conveying section, with the result that the pressure-exerting forces are transmitted to the packs 10 in an offset manner, in any case not in the same transverse plane.

The intermediate belts 31, 32 are each provided, as independent conveying elements, on a mount, namely on horizontal carrying webs 43, 44 formed from flat material. These carrying webs are connected in a suitable manner to a carrying framework for the entire conveying apparatus. The rollers for the intermediate belts 31, 32 are arranged on the underside of the carrying webs 43, 44.

The intermediate belts 31, 32 are driven in the conveying direction, to be precise by a main gear mechanism of the packaging machine. The drive power is transmitted in a suitable manner to correspondingly positioned deflecting rollers 45, 46, 47—with a horizontal axis of rotation.

In the region of the checking section 30, the packs 10 are checked by optoelectronic checking elements during transportation. These elements are (two) cameras 48, 49 which are positioned in a stationary manner above and beneath the movement path of the packs 10 in the region of the checking section 30. The cameras 48, 49 are offset with respect to one another in the conveying direction. In the case of this example, the bottom camera 49 is located in closer proximity to the inlet side of the conveying unit. The cameras 48, 49 are arranged along a common, vertical central plane of the checking station 30, more precisely, directed at an angle with respect to the (horizontal) conveying plane of the packs 10. The inclination angle of the cameras lies between 30° and 60°, preferably 45°, with the result that the packs 10 are sensed diagonally from top to bottom. The top camera 48 predominantly senses the front side 14, which is oriented to the front in the transporting direction, and the top side surface 16 of the packs 10, while the bottom camera 49 picks up the rear side 15 and the bottom side surface 17. If expedient for reasons of space or some other reasons, it is also possible for the bottom camera 49 to be positioned in a rearwardly oriented oblique position (chain-dotted lines in FIG. 5). In this case, the abovedescribed pack surfaces are sensed via a correspondingly positioned mirror 50.

Also in the region of the conveying section 30, that is to say in the region of the intermediate belts 31, 32, defective packs 10 are separated out from the conveying stream. In the case of the present exemplary embodiment, a (mechanical) ejector 51 is arranged, for this purpose, above the movement path of the packs 10. In this case, said ejector is mounted on an upright carrying arm 52 on the carrying web 44, to be precise in an oblique relative position. The ejector 51 comprises a pressure-medium or pneumatic cylinder 53. For the purpose of separating a defective pack 10 out from the top position, which is illustrated in solid lines in FIG. 7, a piston rod with an ejector head 54 is extended downwards (chain-dotted lines). As a result, the relevant pack is gripped at a top side edge or corner and forced downwards. The pack 10 is forced out of the position in which it is retained between the conveying strands 33, 34 and drops into a collecting container 55. In order to facilitate the ejecting operation, the ejector 51 is positioned such that there is no pressure-exerting roller 41 on the opposite side, that is to say the ejector 51 is located between two pressure-exerting rollers 41 located adjacent to one another on the opposite side.

Following the checking section 30, the packs 10 which are formed correctly are transferred to the removal conveyor 38 from the conveyors in the region of said checking section, that is to say from the intermediate belts 31, 32. Said removal conveyor, in turn, comprises a top belt 57 and a bottom belt 58. The packs 10 are transported, without any change in relative position, into the region of the removal conveyor 38 by the intermediate belts 31, 32, such that the top belt 57 and bottom belt 58 grip the packs 10 in the region of the upwardly and downwardly oriented side surfaces 16 and 17.

Following the removal conveyor 38, the packs 10 may be fed for further processing. Transfer to a second drying unit is advantageous, to be precise as is described in U.S. Pat. No. 4,636,186. The removal conveyor 38 transports the packs 10 directly into the region of a further drying turret (not shown). In the end region of the removal conveyor 38, the packs 10 are accumulated to form a closely packed layer.

An important special feature is shown in FIGS. 10, 11 and 12. This involves the elimination of extraneous light during the optoelectronic checking of the packs 10. For this purpose, the elements involved in the optoelectronic checking as well as a sub-region of the checking section 30 are encapsulated, and thus protected against the action of extraneous light.

The top camera 48 and the bottom camera 49 are each arranged in an elongate housing or shaft 59 and 60. The latter is an elongate, cross-sectionally rectangular housing-like structure in which the camera 48, 49 is fastened, to be precise in this case on a side wall 61, 62 of the respective shaft. Each shaft 59, 60 is closed all the way round apart from an opening 63 which is directed towards the objects which are to be checked, namely the packs 10. The packs 10 running past can be sensed by the respective camera via this opening 63.

In addition, a region of the checking section 30 is accommodated in a housing 64. This is connected in a suitable manner to a carrying framework of the apparatus. The housing encloses a conveying section of the belts for transporting the packs 10, namely the intermediate belts 31, 32. Side walls 65, 66 directed transversely thereto are provided with openings (not shown) which permit the through-passage of the conveying elements—intermediate belts 31, 32—with the packs 10, that is to say permit these conveying elements to enter into the housing 64 and to leave the latter. Moreover, the housing 64 is closed all the way round apart from the openings 63. The shafts 59, 60 adjoin said housing 64; they are connected thereto (FIG. 11).

The cameras 48, 49 are positioned in a specific manner within the housing or shaft 59, 60. A light-permeable partition, namely a glass panel 67 (or a partition wall made of another material) delimits a chamber which is closed all the way round and is intended for receiving the respective camera 48, 49. The latter is protected against dust and other influences by the glass panel 67. The glass panel is arranged in a mount 68 which is connected to the shaft 59, 60.

In order to ensure access to the interior of the shaft 59, 60, a side wall 69 is provided with a closable opening formed by a pivotable flap 70. The latter is fixed by a closure screw 71. The flap 70 is located in a region outside the closed chamber for the camera 48, 49.

In order for the optimum image of the packs 10 to be sensed, the packs are illuminated in the region of the checking section, in particular within the housing 64. For this purpose, each camera is assigned (two) light sources 72, 73. These are each positioned, on mutually opposite sides, alongside the respective camera 48, 49, within the chamber which is closed off by the glass panel 67.

The light sources 72, 73 are preferably the ends of glass-fibre bundles. These are connected to a remote light source (not shown), which preferably emits the light cyclically, that is to say in flashes.

In addition or as an alternative, light sources may be arranged in the housing 64.

We claim:

1. An apparatus for the optoelectronic checking of cuboidal packs (10) once the packs have left a packaging machine, wherein, in a region of a horizontal checking section (30), the packs (10) are transported along a movement path in a forward conveying direction by a conveyor and, during this transport, are checked for correct formation by optoelectronic monitoring elements of the apparatus, and for defective packs (10) to be separated out from the path, said apparatus further comprising, in a region of the horizontal checking section (30), conveying belts (31, 32) which exclusively transport the packs (10), wherein the conveying belts (31, 32) are disposed such that they butt exclusively against mutually opposite pack surfaces, which are directed laterally with respect to the conveying direction, and in a top region of the pack surfaces above an imaginary horizontal center plane (35) of the packs (10), and such that the packs (10) are transported exclusively in such a way that they hang between the conveying belts (31, 32).

2. The apparatus according to claim 1, wherein, in the region of the checking section (30), the packs (10) are supported by supporting elements which are located on both sides of the movement path, said supporting elements comprising pressure-exerting rollers (41, 42) which, in the region of the checking section (30), butt against the conveying belts (31, 32), with the supporting elements on one side of the movement path being arranged offset with respect to the supporting elements on the other side of the movement path, so that pressure-exerting forces acting on the laterally-directed pack surfaces (18, 19) are transmitted to the packs (10) in an offset manner and not in the same transverse plane.

3. The apparatus according to claim 1, wherein the conveying belts (31, 32) are round belts which butt against the laterally-directed pack surfaces in said top region thereof.

4. The apparatus according to claim 1, wherein the conveying belts convey the packs (10), along the horizontal checking section, with narrow, elongate side pack surfaces (16, 17) being directed upwards and downwards, a narrow base pack surface (18) and end pack surface (19) being directed to the side, and a large-surface front pack side (14) and a rear pack side (15) being directed to the front and rear, respectively.

5. The apparatus as claimed in claim 1, wherein said monitoring elements are two cameras (48, 49), and wherein in each case one camera (48, 49) is positioned above and one beneath the movement path of the packs (10), such that longitudinal axes of the cameras (48, 49), or of the optical system thereof, are directed at an angle with respect to the plane of the movement path of the packs (10), such that diametrically opposite surface regions of the packs (10) can be sensed optically by the two cameras (48, 49).

6. The apparatus as claimed in claim 1, wherein, in the region of the checking section (30) following the monitoring elements (48, 49), there is an ejector (51) which separates out defective packs (10) from the movement path of the packs (10).

7. The apparatus as claimed in claim 6, wherein the ejector (51) has an ejector head (54) which can be moved by a cylinder (53) and, by virtue of a downwardly directed movement, can be displaced against the pack (10) which is to be ejected.

8. The apparatus as claimed in claim 1, wherein, in the region of the checking section (30), the packs (10) are supported by supporting elements which are arranged on both sides of the movement path, and which comprise pressure-exerting rollers (41, 42), which, in the region of the checking section (30), butt against conveying strands (33, 34) of the conveying belts (31, 32).

9. The apparatus as claimed in claim 1, characterized by a preliminary conveyor (56), which is arranged upstream of the intermediate belts (31, 32) in the conveying direction, and by a removal conveyor (38), which adjoins the conveying belts (31, 32), the packs (10) butting against upwardly and downwardly directed pack surfaces in the region of the preliminary conveyor (56) and of the removal conveyor (38).

10. The apparatus as claimed in claim 1, wherein the packs (10) can be checked in a region of the checking section (30) which is shielded from extraneous light.

11. The apparatus as claimed in claim 10, wherein the cameras (48, 49) are arranged entirely in elongate shafts (59,

60) each of which has an opening (63) on a side thereof which is directed toward the packs (10) which are to be checked.

12. The apparatus as claimed in claim 11, wherein a region of the checking section (30) runs in a housing (64) which, in the region of side walls (65, 66), has openings for the through-passage of the packs (10) including the conveying elements, the shafts (59, 60) being connected to the housing (64).

13. The apparatus as claimed in claim 11, wherein the cameras (48, 49) are assigned light sources (72, 73) within the shafts (59, 60) or the housing (64).

* * * * *